July 21, 1959 H. R. W. A. KOCH ET AL 2,895,720
APPARATUS FOR TREATING GRANULAR MATERIAL
Filed Dec. 24, 1957 3 Sheets-Sheet 2

July 21, 1959 H. R. W. A. KOCH ET AL 2,895,720
APPARATUS FOR TREATING GRANULAR MATERIAL
Filed Dec. 24, 1957 3 Sheets-Sheet 3

INVENTORS
Hans Robert Werner Albin Koch
and Hans Joachim Koch
BY  MICHAEL S. STRIKER.
ATTORNEY United States Patent Office 2,895,720
Patented July 21, 1959

2,895,720

APPARATUS FOR TREATING GRANULAR MATERIAL

Hans Robert Werner Albin Koch and Hans Joachim Koch, Stuttgart-Bad Cannstatt, Germany Application December 24, 1957, Serial No. 705,005

Claims priority, application Germany December 24, 1956

6 Claims. (Cl. 259—5)

The present invention relates to apparatus for treating a granular material.

For example, the present invention is applicable to granular material such as barley or green malt located in a suitable container for germinating purposes. In installations of this type it is necessary to provide devices capable of performing such operations as introducing and distributing the granular material in the container, stirring or mixing the granular material while it is in the container, and discharging the granular material from the container. It is conventional to provide separate devices for performing all of these operations, and this is a considerable inconvenience inasmuch as it is necessary to move each of the devices separately to and from the container, and furthermore a considerable amount of space is required for storing the devices outside of the container in which the granular material is located.

One of the objects of the present invention is to overcome the above drawbacks by providing an apparatus wherein two or more of devices of the above type may be optionally connected together for simultaneous treatment of granular material or may be used separately for treatment of the granular material.

Another object of the present invention is to provide an apparatus of the above type which does not require these devices to be removed from the container so that there is no problem with storage of the devices and so that the devices may be incorporated into relatively small installations.

A further object of the present invention is to provide an apparatus which is capable of being added to existing conventional containers for granular material so as to be capable of being used with such conventional containers.

An additional object of the present invention is to provide a plurality of devices of the above type which are capable of being connected together optionally in different combinations to perform any desired operations either separately or simultaneously.

It is also an object of the present invention to provide a structure of the above type which is capable of treating the granular material without spilling the same outside of the container and which is capable of moving the granular material around efficiently.

The objects of the present invention also include the provision of structure capable of accomplishing all of the above objects and at the same time composed of simple and ruggedly constructed elements which are very reliable in operation.

With the above objects in view, the present invention includes in an apparatus for treating granular material an elongated container for the granular material and at least a pair of different devices for performing different operations on the material. A suitable means is provided, in accordance with the present invention, for optionally connecting the devices together for simultaneous operation on the material or for separating the devices from each other so that only one of them may operate on the material while the other device remains in an idle position at an end of the container, for example.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
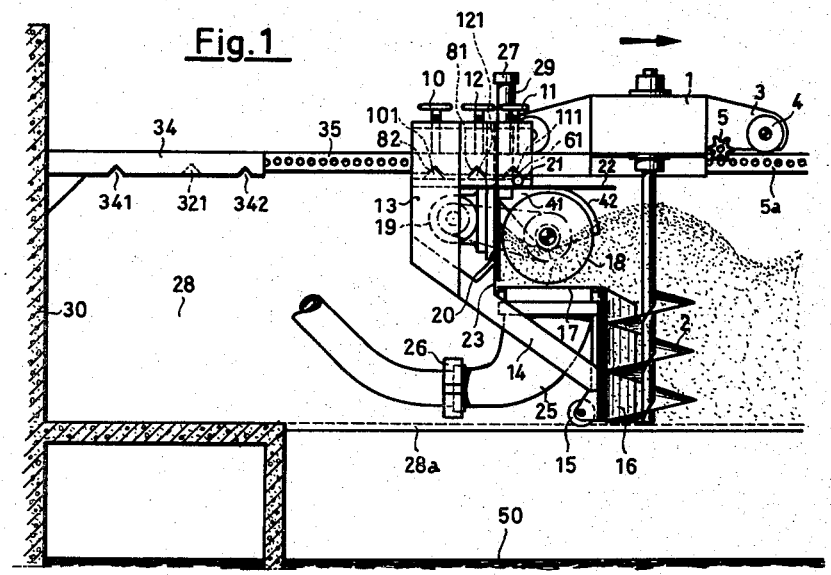
Fig. 1 is a fragmentary side elevational partly sectional view of one possible embodiment of a structure of the present invention, Fig. 1 showing three different devices all connected together and operating simultaneously.

Fig. 1 illustrates an end portion of an elongated container 28 for a granular material of the type referred to above. A carriage 1 extends transversely across this container and this carriage carries a row of six screw members 2 which are vertical and which are turnable about their vertical axes. The carriage 1 includes the end portions 3 which are located over a pair of rails 35 (Fig. 4) on which wheels 4 connected to the carriage ride. The drive of the carriage includes the motor 36 shown in Fig. 4 carried by the carriage and driving a pair of shafts 37 which are connected at their ends to a pair of gears 5 for turning these gears. The rails 35 carry a plurality of teeth 5a which cooperate with the gears 5 in a manner similar to a rack, so that the turning of the shaft 37 causes the gears 5 to turn along the teeth 5a and in this way the carriage 1 together with the vertical screw members 2 are longitudinally transported along the container 28. The screw members 2 are driven from any suitable motor which is not illustrated in the drawings.

Figure 4:
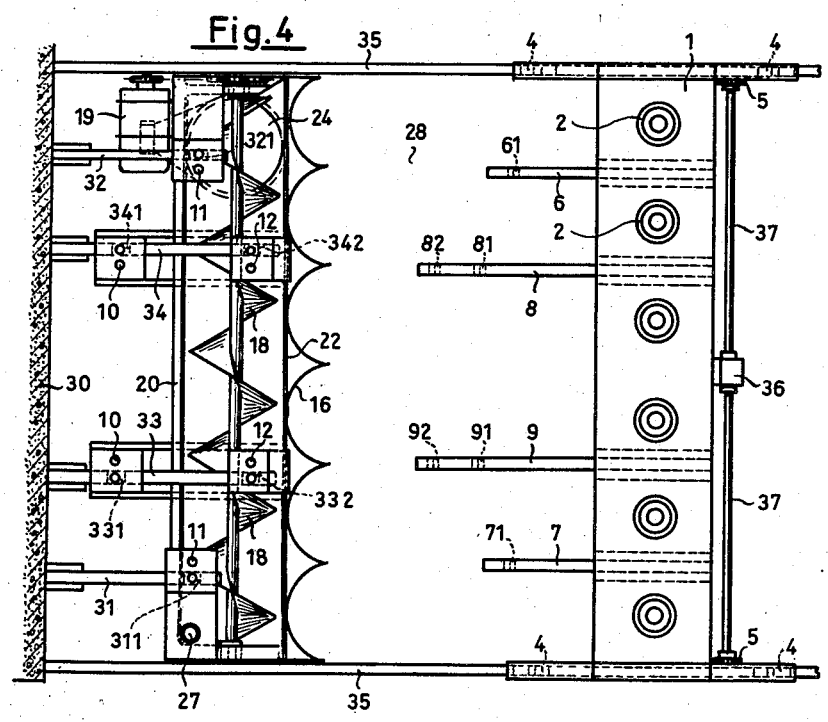
Fig. 4 is a plan view of the structure of Fig. 3.

The carriage 1 fixedly carries at its left edge, as viewed in Fig. 4, four connecting bars 6–9 of different lengths which extend to the left from the carriage 1 in the longitudinal direction of the container 28, as viewed in Fig. 4. The connecting bars 6 and 7 are of the same length and the connecting bars 8 and 9 are of the same length while being longer than the connecting bars 6 and 7. These bars 6–9 of rectangular cross section are formed with notches. Thus, the bars 6 and 7 are formed with the notches 61 and 71, respectively, while the bar 8 is formed with notches 81 and 82 and the bar 9 is formed with the notches 91 and 92. In the position of the structure shown in Fig. 1 devices in addition to the screw members 2 are connected by means of the connecting bars 6—7 to the carriage 1 for longitudinal movement therewith, and connecting devices 10—12 resting with connecting elements 101, 111, 121 in the notches 61, 71; 81, 82; 91, 92; serve to connect these additional devices to the connecting bars 6–9 for movement with the carriage 1. In the position of the parts shown in Fig. 1 all of the devices cooperate together to discharge the granular material from the container.

Figure 2:
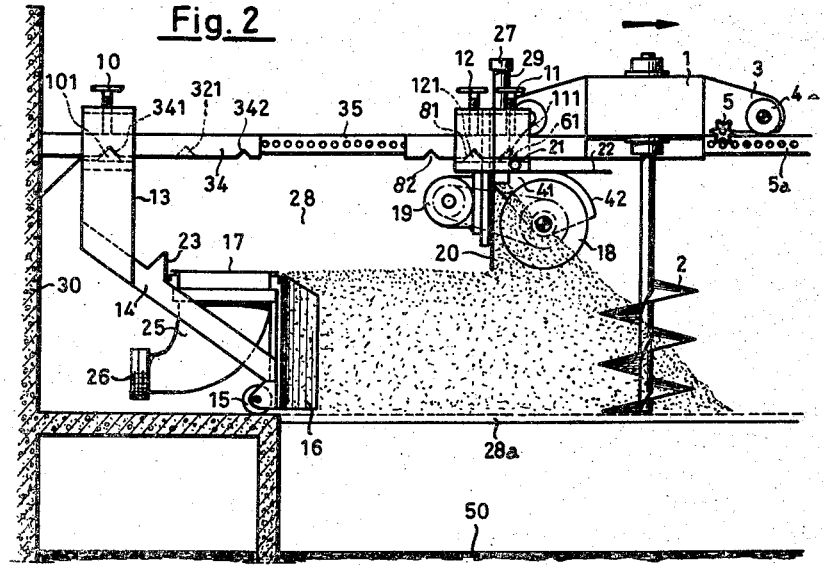
Fig. 2 shows the structure of Fig. 1 with a device which forms part of a movable end wall of the container in a rest position while the other two devices continue to operate.

As may be seen from Fig. 2 the connecting devices 10 are respectively connected through members 13 with inclined carrier members 14 which terminate at their bottom ends in rollers 15 which serve to support a lower wall portion 16 of the container for movement longitudinally thereof. This wall portion 16 forms part of an end wall of the container. As is apparent from Fig. 4, there are a pair of connecting devices 10 which are respectively connected to the inclined members 14 for connection with the roller supported lower end wall portion 16 of the container. The upper edge of the lower end wall portion 16 is connected with the right edge of a horizontal wall portion 17 which participates in the removal of granular material from the container, and this horizontal wall portion 17 which extends transversely across the container and which is carried by wall portion 16 as well as elements 14 is connected at its left edge, as viewed in Fig. 2, with a closure strip 23 which is in a vertical plane and which extends transversely across the container also, this strip 23 being carried by the pair of inclined members 14 which are respectively connected with the members 13. The lower wall portion 16 of the container is in the form of a series of half cylinders located one next to the other across the container and corresponding in number and in position to the several screw members 2. One end of the horizontal wall 17 is formed, as shown most clearly in Fig. 4, with a discharge opening 24 which communicates with a curved conduit 25 carried by the wall 17 and capable of being connected at 26 to another conduit which is flexible and which leads to any suitable suction device not shown in the drawing so that material discharged into the pipe 25 will be drawn out of the container 28. For the purpose of having the granular material aerated from below, the container bottom 28a is perforated and arranged at a certain distance from the ground 50. Material can be introduced into the container through the upper inlet end 27 of a pipe 29 leading into the container for delivering the granular material into the operating region of the horizontal screw 18, so that material flowing downwardly through the pipe 29 will be received by the horizontal screw 18 to be distributed by the latter across the container.

The supply pipe 29 is carried by the connector element 11 which is shown at the lower part of Fig. 4, this connector element 11 being interconnected with an opposite connector 11 located at the other side of the elongated container 28 by an elongated vertical plate 20 which extends transversely across the container 28. The pair of connectors 11 also carry, respectively, a pair of plates provided with bearings which rotatably support the transverse screw 18, and a motor 19 carried by the plate 20 adjacent the connector 11 shown at the upper part of Fig. 4 drives the transverse screw 18 through a belt and pulley drive.

Figure 3:
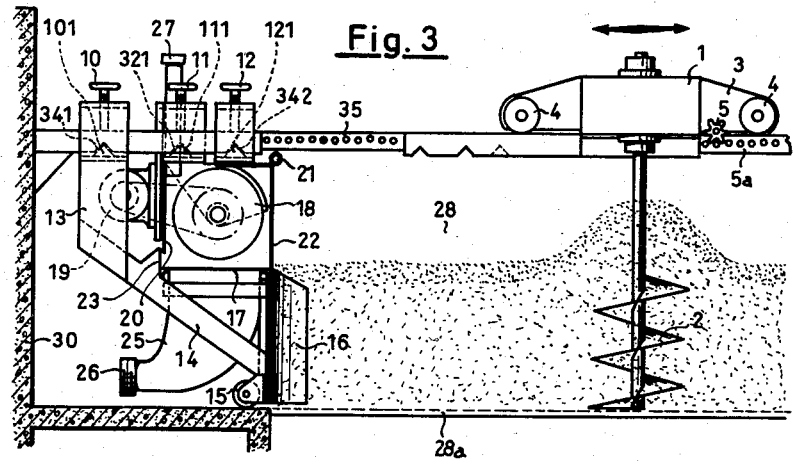
Fig. 3 shows the structure of Fig. 1 where a pair of the devices of the invention are in a rest position at one end of the container while the third device continues to operate.

A pair of additional connectors 12 support an elongated plate 22 which extends transversely across the container from a hinge 21, and the plate 22 engages the curved guide surfaces 42 of the plates 41 during movement of the plate 22 from the horizontal position shown in Figs. 1 and 2 to the vertical position shown in Fig. 3, the plate 22 forming an upper extension of the wall 16 in the position of plate 22 shown in Fig. 3, so that this plate 22 forms an upper end wall portion of the container, the wall 16 forming the lower portion of this same wall. The plate 41 are the plates respectively connected to the connectors 11 and respectively carrying the bearings which turnably support the transverse screw 18. With the parts in the position of Fig. 1 the walls 17 and 20 cooperate to form a channel in which the screw 18 is located, and this channel is open along one side to give the screw 18 access to the interior of the container. It will be noted that strip 23 provides a closed transition between walls 17 and 20.

The rigid wall 30 fixedly supports connector bars 31—34 which also are of rectangular cross section. The bars 31 and 32 are of equal length and the bars 33 and 34 are of equal length. These bars cooperate with the bars 6—9 and the connectors 10—12 for optionally connecting the different devices or units either to the carriage 1 for movement therewith or to the wall 30 to be held in a stationary position. For this purpose the bars 31—34 are respectively provided with notches, the bar 34 having notches 341 and 342, the bar 33 having the notches 331 and 332, and the bars 31 and 32 respectively having the notches 311 and 321. Each of the connectors 10—12 is in the form of a relatively short tube of rectangular cross section through which the connector bars may freely extend, and the turning of the screw members of these connectors serves to connect, in cooperation with the notches of the bars, the units either to the wall 30 or to the carriage 1.

The organization is shown in Fig. 1 in the position where none of the units are connected to the stationary bars 31—34. All of the units are connected to the carriage 1, the screws 2 being permanently connected with the carriage, the connectors 11 cooperating with the bars 6 and 7 for connecting the horizontal screw means to the carriage, and the connectors 10 and 12 cooperating with the bars 8 and 9 for connecting the lower wall portion 16 and the wall 22 to the carriage, the wall 22 being in its horizontal position giving the screw 18 access to the interior of the container as indicated in Fig. 1.

In this position of the parts, which is the position they take for discharging the granular material from the container 28, the rotating screws 2 cooperate with the half cylinders of the wall 16, respectively, to raise the granular material to the wall 17 along which the rotating screw 18 conveys the material to the discharge opening 24 and pipe 25 from where the material is withdrawn by suction through a suitable conduit connected to the pipe 25 at the threaded end portion 26 thereof. As the screws turn the gears 5 also turn and cooperate with the teeth 5a of the rails 35 to advance the entire assembly to the right in the direction of the arrow shown in Fig. 1, so that all of the material is discharged from the container as the devices progress toward the container end wall opposed to the movable end wall 16 thereof. This end wall opposite wall 16 is also formed with a series of half cylinders which cooperate with the wall 16 at the end of the movement of the organization to the right to form complete cylinders in which the screws 2 are respectively located so that all of the material is discharged in this way.

After the container has been emptied the drive of the gears 5 is reversed and the entire assembly moves to the left end position adjacent the wall 30. At the end of this movement several connector bars 31—34 enter into and extend through the connectors 10—12. The screws of the connectors 10 are manipulated at the time to disconnect them from the bars 8 and 9, which are now beside the bars 33 and 34, and to connect them to the bars 33 and 34, so that when the gears 5 are driven to again advance the carriage 1 to the right, the lower wall portion 16 remains in the position shown in Fig. 2 and the rest of the organization advances the carriage 1 to the right, as shown in Fig. 2. At this time fresh granular material is fed through a suitable conduit, hopper, or the like connected to inlet end 27 of pipe 29 into the latter to be delivered to the screw 18 which distributes the material across the container. Thus, the parts are shown in Fig. 2 in the container filling position where the screw 18 distributes the material across the container as the carriage 1 and the structure connected thereto advances longitudinally along the container, and at this time the lower edge of wall 20 levels off the top surface of the granular material.

In the position of the parts shown in Fig. 2 the connectors 11 and 12 in cooperation with notches 61, 71, 81 and 91 connect the horizontal screw means and wall 22 to the carriage 1. The connectors 10 in cooperation with notches 331 and 341 of bars 33 and 34, respectively, maintain the wall 16 in the position shown in Fig. 2.

After the container has been charged in the above-described manner, the carriage is returned to its left end position, the screws 2 turning at this time so that the material is mixed thereby. In this left end position the connectors 11 and 12 are manipulated for connecting the horizontal screw means and wall 22 to the bars 31—34 in the manner shown in Figs. 3 and 4, and it will be noted that in this position the hinge 21 which is carried by the connectors 12 is located over the wall 16 so that the wall 22 now hangs down to close off the horizontal screw means from the container 28 and to cooperate with wall 16 to form a complete end wall. The connection of the horizontal screw means and wall 22 to the bars 31—34 and the disconnection thereof from the bars 6—9 releases the carriage 1 for movement back and forth longitudinally along the container 28 so that the rotating screws 2 can operate by themselves, as shown in Fig. 3, to thoroughly and uniformly mix the granular material.

When it is again desired to discharge the material from the container, carriage 1 is located in its left end position and the connectors 10—12 are joined with the bars 6—9 and released from the bars 31—34, the connectors 12 being shifted to the left with respect to the screw 18 from the position of Fig. 3 to that of Fig. 1 so that the wall 22 opens the channel in which the screw 18 is located, and now the entire assembly is advanced to the right, as viewed in Fig. 1, to discharge the granular material in the manner described above.

Figure 5:
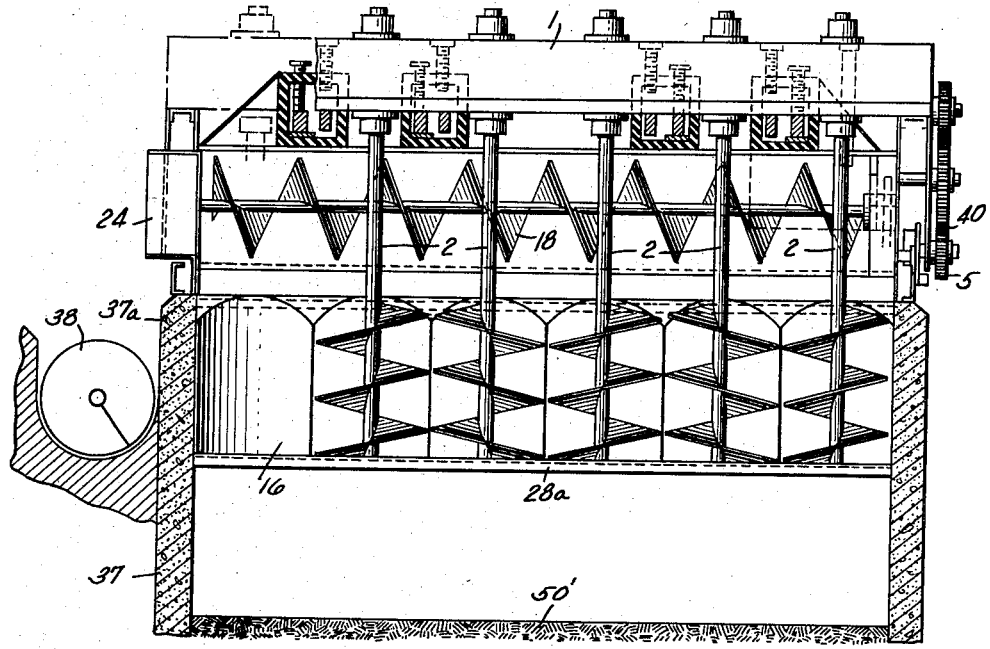
Fig. 5 is a transverse, partly sectional elevational view of another embodiment of a structure according to the present invention.
Figure 6:
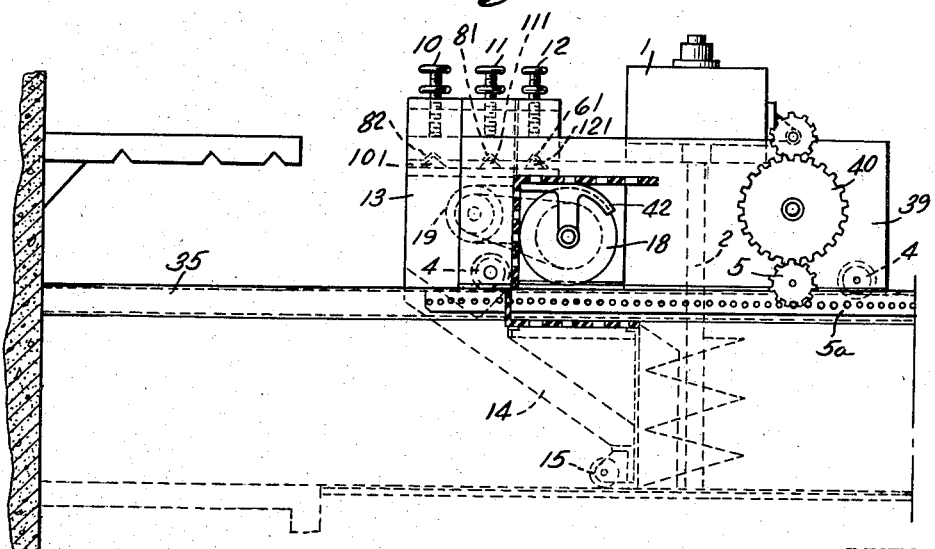
Fig 6 is a longitudinal partly sectional elevational view of the structure of Fig 5.

In the embodiment of the invention which is shown in Figs. 5 and 6 the above-described devices or units are the same and operate in the same way. This embodiment differs from that of Figs. 1–4 by having side walls 37 of the container 28 which are provided with top edges lower than the side walls of the container of Figs. 1–4. The rails 35 carried by the top edges of the side walls, respectively, are therefore at a lower elevation, and the carriage 1 is provided with a gear transmission 40 for driving the gears 5 which are now at a lower elevation. In addition, the carriage 1 carries at its opposite ends just over the side walls of the container a pair of shield plates 39 which prevent the granular material from spilling over the sides of the container during movement of the material treating devices therealong.

A further difference of the embodiment of Figs. 5 and 6 is that wall 17 is not formed with the discharge opening 24. Instead the left end wall 41 of the horizontal screw means, as viewed in Fig. 5, is formed with an outlet 24' at a higher elevation than the upper edge portion 37a of the left side wall 37 shown in Fig. 5, so that the screw 18 can discharge the granular material through the outlet 24' directly over the side of the container to the exterior thereof. At the exterior of the container a conveyor screw 38 is positioned longitudinally along the left wall 37 of Fig. 5 to receive the granular material from the discharge outlet 24' for conveying this material to the desired location.

Except for the above-noted differences, the embodiment of Figs. 5 and 6 is identical with that of Figs. 1–4.

The above-described structure of the invention can be built into conventional containers and enables the three operations of charging, discharging, and mixing to be carried out through the preselected interconnection of the several units. The structure of the invention does not require a great deal of material, operates with a relatively low power consumption, and is extremely compact so that it takes up little space. Furthermore, the structure is fully automatic and requires no auxiliary personnel to carry out the operations.

It is possible to simplify the above construction when adapting it to particular operating conditions by combining the units into different subcombinations. For example, the horizontal screw means may be connected directly with the wall 16 to form a unit therewith, and in this way lesser connecting and disconnecting devices and bearings are required. With such an arrangement a charging operation as described above would not be carried out, and the container would be charged in a different and conventional manner. Of course, other variations suitable to various operating conditions are possible.

It will be understood that each of the elements described above, or two or more together, may also find a useful application in other types of apparatus for treating granular material differing from the types described above.

While the invention has been illustrated and described as embodied in adjustable apparatus for treating granular material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for treating granular material, comprising, in combination, an elongated container for the granular material; carriage means longitudinally movable along the container; a plurality of vertically extending screw means carried by said carriage means for movement therewith longitudinally along the container; a horizontal screw means extending transversely across the container; means for optionally connecting said horizontal screw means with said carriage for movement therewith or with a wall of the container, said horizontal screw means including an elongated channel extending across the container, having a horizontal screw located therein, and being open along at least one side; and supply means communicating with the interior of said channel for supplying granular material thereto to be distributed by said horizontal screw means in the container.

2. Apparatus as recited in claim 1 and wherein said channel is formed with a discharge opening through which the horizontal screw is capable of discharging the granular material from the container; and means cooperating with said discharge opening for continuing the movement of the granular material away from the container.

3. Apparatus for treating granular material comprising, in combination, an elongated container for the granular material, said container having a longitudinal side wall having a top edge located at a predetermined elevation; a carriage movable longitudinally along said container; a horizontal screw means including an elongated horizontal screw extending transversely across the container and an elongated channel in which the screw is located, said channel being open along at least one side and having an end wall located at a higher elevation than the top edge of said side wall of said container and formed with a discharge opening through which the horiozntal screw is capable of discharging granular material from the container over the edge of said side wall thereof; means for optionally connecting said horizontal screw means with said carriage for movement therewith or with a side wall of the container; and an elongated stationary screw means located at the exterior of the container along said side wall thereof for receiving granular material discharged through said end wall of said channel by said horizontal screw to further transport the material discharged over the edge of the side wall of the container by said horizontal screw means.

4. Apparatus for treating granular material comprising, in combination, an elongated container for the granular material; carriage means longitudinally movable along the container; horizontal screw means extending transversely across the container for moving granular material therein, said screw means including a wall member shiftable between a vertical position where said wall member forms part of a movable wall of the container and a horizontal position where said wall member frees the horizontal screw for access to the interior of the container; and means for optionally connecting said horizontal screw means with said carriage for movement therewith or with a stationary wall of the container.

5. Apparatus for treating granular material comprising, in combination, an elongated container for the granular material; carriage means longitudinally movable along the container; a plurality of vertical screw members arranged in a row along and carried by said carriage means, said row extending transversely across the container and said screw members being turnable while said carriage means moves longitudinally along said container for moving granular material in the container; a longitudinally movable end wall portion forming part of an end wall of the container, said end wall portion being in the form of a series of half cylinders arranged next to each other in a row extending transversely across the container; means for optionally connecting said end wall portion to said carriage for movement therewith with said half cylinders partly surrounding said screw members, respectively, so as to form therewith screw conveyors for moving granular material upwardly away from the bottom of the container and for connecting said end wall portion of the container to a stationary wall to maintain said end wall portion in an inoperative position, so that the vertical screw members may be used by themselves for mixing granular material in the container; and horizontal screw means extending across the container; and means for optionally connecting said horizontal screw means to said carriage either with said end wall portion or without the same and to the stationary wall to maintain the horizontal screw means in an inoperative position, said horizontal screw means being capable when connected to the carriage without the end wall portion of distributing granular material in the container and being capable when connected to the carriage with the end wall portion of receiving material transported by the screw members and half cylinders and further transporting the material.

6. Apparatus for treating granular material, comprising, in combination, an elongated container for the granular material; carriage means longitudinally movable along the container; a plurality of vertically extending screw means carried by said carriage means for movement therewith longitudinally along the container; a longitudinally movable end wall portion forming part of an end wall of the container; horizontal screw means extending transversely across the container; means for optionally connecting said horizontal screw means to said carriage, either with said end wall portion or without the same, for movement with said carriage, so that said end wall portion is movable together with said carriage and horizontal screw means when connected to said carriage with said horizontal screw means and so that only said horizontal screw means and carriage are movable together when said horizontal screw means is connected to said carriage without said end wall portion, said horizontal screw means including an elongated channel extending across the container, having a horizontal screw located therein, and being open along at least one side; and supply means communicating with the interior of said channel for supplying granular material thereto to be distributed by said horizontal screw means in the container.

References Cited in the file of this patent
UNITED STATES PATENTS

| | | |
|---|---|---|
| 582,327 | Theurer et al. | May 11, 1897 |
| 2,707,097 | Raasch | Apr. 26, 1955 |